April 14, 1942.  W. C. TEUNISZ  2,279,419
MILK CONTAINER AND INTERNAL CLOSURE OR SEPARATOR
Filed June 13, 1940   2 Sheets-Sheet 1
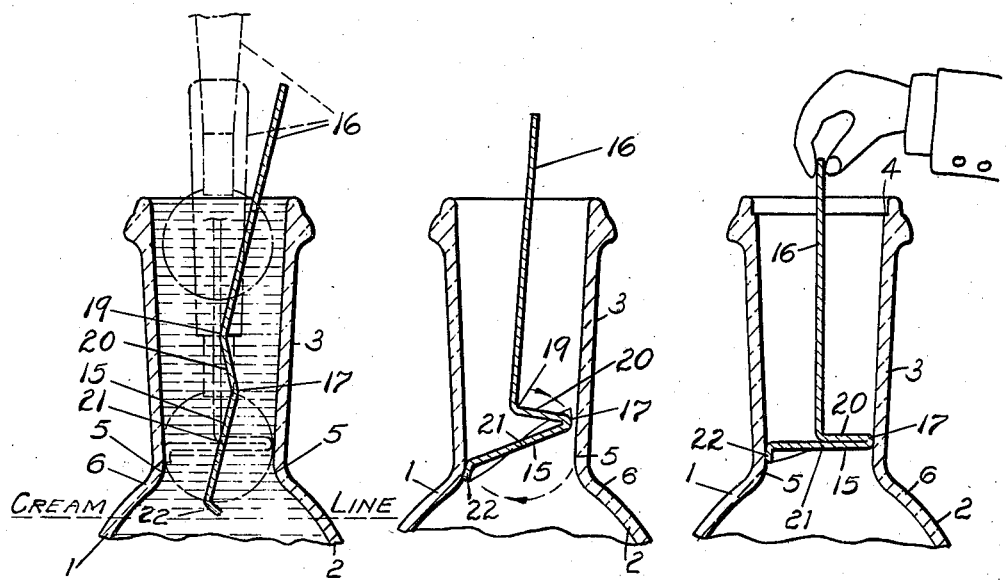
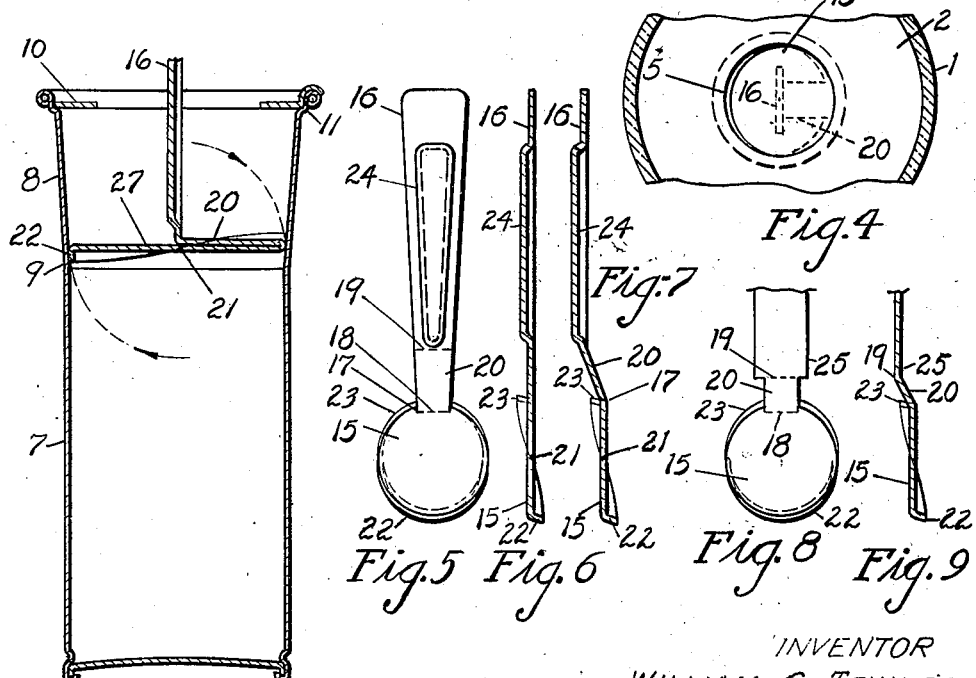
INVENTOR
WILLIAM C. TEUNISZ
BY
Chappell, Earl Chappell
ATTORNEYS

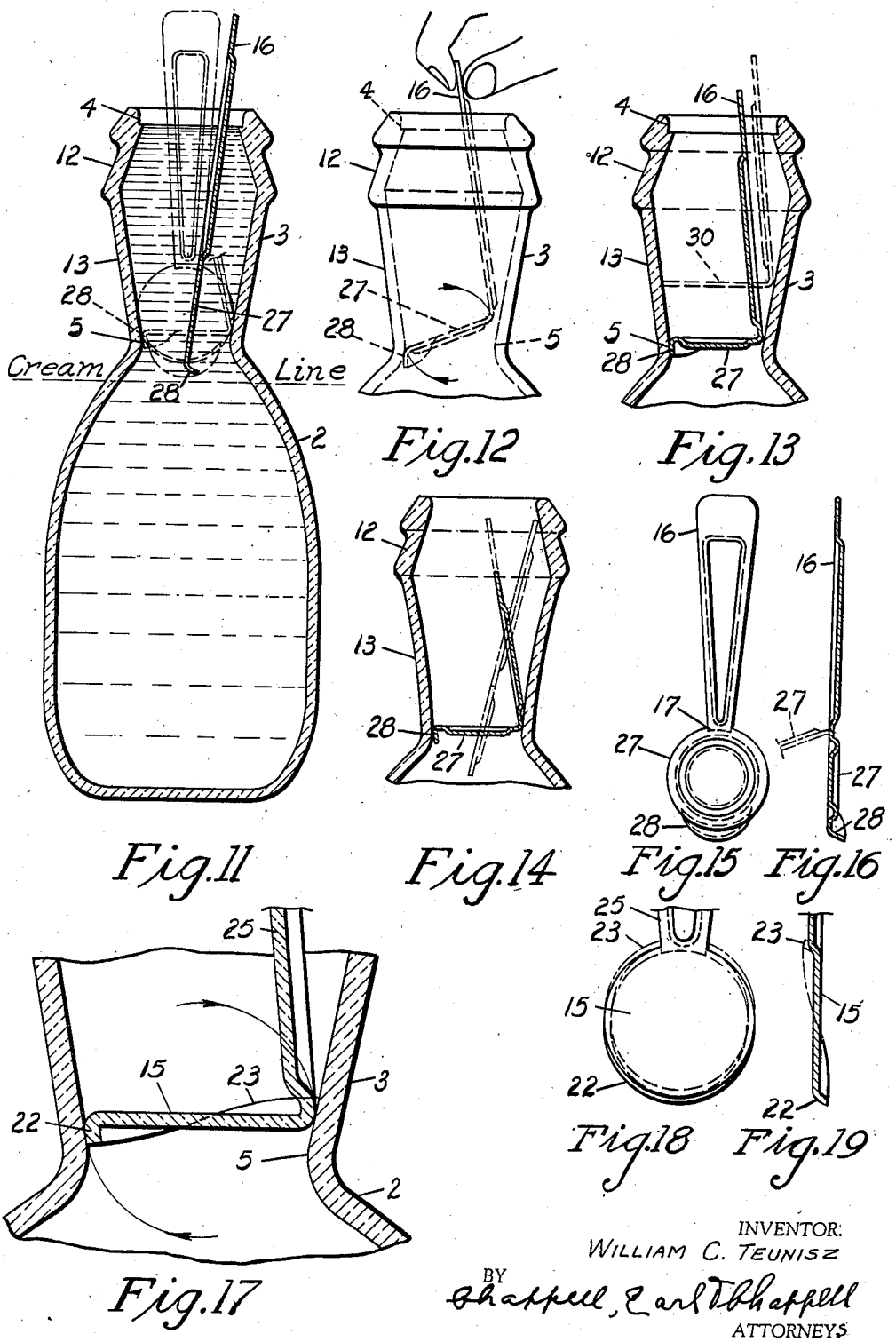

Patented Apr. 14, 1942

2,279,419

UNITED STATES PATENT OFFICE 2,279,419

MILK CONTAINER AND INTERNAL CLOSURE OR SEPARATOR

William C. Teunisz, Grand Rapids, Mich.

Application June 13, 1940, Serial No. 340,381

11 Claims. (Cl. 210—51.5)

The main objects of my invention are:

First, to provide a milk bottle or container comprising a lower milk portion and an upper cream portion in combination with a separating or closure disk for the milk portion whereby the cream may be readily poured off without becoming mixed with the milk.

Second, to provide a container of this character in which the separator or closure may be readily introduced without spilling or agitating the contents to such an extent as to cause mixing of the cream and milk.

Third, to provide a container of this character in which there are no internal shoulders or projections, so that the container may be easily kept in a sanitary condition.

Fourth, to provide an internal closure disk for a milk container, which may be inserted at the same time or after the whole milk is introduced, permitting the cream to rise, and which, after the cream has risen, may be adjusted to closing position to permit the pouring off of the cream.

Fifth, to provide a closure disk of this type, which may be easily introduced and manipulated to sealing position mainly by a thrust movement or thrust upon the handle.

Sixth, to provide an internal closure of the character indicated, which may be economically produced so that it may be thrown away or discarded after a single use. However, it is preferable to make the device of lasting construction for permanent use.

Further objects relating to details and economies of my invention will definitely appear from the description to follow. The invention is defined in the claims.

Preferred embodiments of my invention are illustrated in the accompanying drawings, wherein:

Fig. 1 is a central vertical section of a container and internal closure illustrating one embodiment of my invention, the closure being shown in section in a position preliminary to seating and by dotted lines in seated position, dotted lines also indicating the manner of releasing and removing the closure, the removing position being at approximately a ninety-degree angle to the other positions.

Fig. 2 is a fragmentary section illustrating one form of closure in partially seated position.

Fig. 3 is a fragmentary section illustrating the closure in completely seated position.

Fig. 4 is an inverted transverse section showing the closure in seated position, the handle being indicated in dotted position.

Fig. 5 is a front view of a closure embodying one feature of my invention, its handle being embossed and the closure being provided with a lip shown in Fig. 10.

Fig. 6 is a longitudinal section of the closure member shown in Fig. 5.

Fig. 7 is a view similar to Fig. 6, illustrating the partial flexing of the handle.

Figs. 8 and 9 are fragmentary front and longitudinal views, respectively, of modified forms of the closure member, before making a complete permanent or temporary bend at 19, the modification being mainly in the handle.

Fig. 10 is a vertical section illustrating my improvements embodied in a container of fibrous or other non-corrosive material and provided with a closure such as shown in Figs. 5, 6 and 7.

Fig. 11 is a vertical section illustrating a slightly modified form of bottle or container and closure, the closure being shown in its initial closing position in longitudinal section and by dotted lines at a ninety-degree angle or position thereto, the closure also being shown in its seated position by dotted lines.

Fig. 12 is a fragmentary view further illustrating the method of seating or removing the closure.

Fig. 13 is a fragmentary view illustrating the use of closures in different positions—that is, closures of different diameters, which results in their seating in different positions in the container.

Fig. 14 is a fragmentary section illustrating the use of the closure as a separator so that cream may be introduced above the skim or whole milk in the event that it is desired to use the receptacle for the delivery of cream and whole or skim milk separately.

Fig. 15 is a front and Fig. 16 is a longitudinal section of the closure illustrated in Figs. 11 to 14.

Fig. 17 is an enlarged fragmentary section illustrating details of the closure and its relation to the container's walls.

Fig. 18 is a fragmentary elevation illustrating the joint for the handle to the closure disk.

Fig. 19 is a central longitudinal section of the closure disk of Fig. 18.

Like numerals refer to like parts throughout the specification.

In the embodiment of my invention as illustrated in Figs. 1, 2 and 3, the container designated generally by the numeral 1 is preferably formed of glass and comprises a lower milk chamber or portion 2 and an upper cream chamber or portion 3. As shown in Figs. 1, 2 and 14, the neck is adapted to receive an outer closure cap, or as shown in Figs. 3, 11, 12 and 13, the neck is provided with a seat 4 for the common type of milk bottle closure disk. In these embodiments, the cream and milk portions of the container communicate through a restricted throat 5, the wall of the upper chamber or cream portion immediately above this throat being downwardly tapered. In these figures, the taper extends to the top or rim of the container. In any event, the taper should be present immmediately above the throat or at the point where it is desired to partition or close the lower chamber. In this embodiment, the tapered walls merge into the outwardly curved walls 6 at the top of the lower chamber, so that the walls are perfectly smooth or there is no ledge or seat rendering the cleaning of the container difficult or likely to wear the brushes commonly used by the smaller dealers particularly for the cleaning of milk receptacles. It will, of course, be understood that my separating device will also operate satisfactorily in a container having a definite upward facing seat or internal shoulders.

In the embodiment shown in Fig. 10, the container 7 is formed of fibrous material, the upper or cream portion 8 thereof having, however, downwardly tapered walls, the taper extending to the point 9 which is the separating point or zone between the milk portion and the cream portion of the container. In this embodiment, the top closure 10 is provided with a seat 11.

In Fig. 11, the container is in the form of a glass bottle, preferably, the upper or cream portion having an upwardly tapering top portion 12 and a downwardly tapering bottom portion 13 which extends or continues to the throat 5.

In Figs. 11, 12 and 13, the neck of the bottle is provided with a shoulder 4 to receive a closure disk of well known or suitable type, while in Figs. 1, 2 and 14, the container is adapted to receive a cap embracing the end of the neck.

The internal closure disk 15 is of a diameter slightly greater than the diameter of the throat 5, and the taper of the wall above the throat is such that this disk may be wedgingly engaged with the wall, effectively sealing the bottom of the cream chamber so that the cream may be poured from the cream compartment, the milk being effectively retained in the milk compartment and this without the necessity of providing a distinct shoulder or seat for the internal closure disk.

The disk is provided with a handle 16 joined to one edge of the closure disk by means of a hinge or bendable portion 17, the hinge, in this case, being formed in the embodiment illustrated by scoring at 18 at the base of the handle, the scoring lines being preferably inset from the edge of the disk as shown at Fig. 5, so that the cylindrical edge surface of the disk is not interrupted. The inset is only the thickness of the material from which the closure is formed. In the embodiment shown in Fig. 2, the handle is also provided with a hinge 19, in this case, also formed by scoring, this hinge 19 being spaced from the joint 17 substantially one-half the diameter of the closing disk or closure.

Thus, it will be understood that in inserting the closure, the portion 20 between the joints may be collapsed upon the disk as illustrated in Fig. 3, so that the thrust of the handle is central of the disk to complete the seating thereof.

If desired, see Figs. 2 and 3, the bend at 19 may be replaced by a permanent bend of approximately right angles to the portion 20, which portion is hinged to the disk at or adjacent to the disk edge.

In the embodiment shown in Figs. 8 and 9, the hinge 19 or its permanent right angled replacement, if desired, is spaced from the hinge 18 substantially less than half the diameter of the disk. This embodiment of my invention is also very satisfactory and is particularly desirable where used in containers having seating shoulders. The separator may be constructed of permanent materials whereby it can be used over and over again for a long period of time or else good paper stock may be used whereupon the separator is discarded after a single use. I may form the closure disk and the handle integrally of a good or firm paper stock of suitable thickness so that it can be forced to form the hinges and forced into sealing position without likelihood of tearing or yielding on account of undue flexibility so that it is forced beyond seating position. However, the handle and the closure disks may be formed separately and suitably hinged or joined.

In introducing the closure, it is inserted edgewise as indicated in Fig. 1 until the disk engages the tapered wall at opposite points thereof. The continued downward thrust on the handle will swing the disk as shown in Fig. 2, the pivot point being indicated at 21, the pivoting continuing until the closure is in a substantially horizontal position, when a continued thrust will collapse part 20 upon the disk and move it to seating position.

The disk may be inserted prior to the delivery of the bottle of whole milk, in which case the handle should be short enough to permit capping of the container. Where, however, it is intended that the closure should be inserted by the customer to separate the cream from the milk, the handle is preferably of such length that it can be manipulated without the fingers of the operator entering the cream. It will be understood that in specifying the cream line and the closure position, arbitrary line points have been indicated. Ordinarily, the closure seating position would be slightly above the line anticipated for the cream line as is indicated in Fig. 1.

When a closure has been inserted in a container containing whole milk previous to delivery and it is desired to remove the cream after it has risen, a push on the end of the handle swings the closure into closing position and the cream may be poured off, the closure then removed by means of the handle, and the milk poured out.

To guide the disk to closed position, it may be provided with a downwardly projecting lip 22 opposite the handle, this lip being segmental and preferably fading out at the pivot point 21—that is, at a point ninety degrees spaced from the handle. The disk may be provided with an upwardly projecting lip-like flange 23 opposite the flange 22, these flanges or lips serving to facilitate the seating of the disk and also to some degree increasing its sealing, although effective sealing is had without this feature.

In Figs. 5, 6 and 7, the handle is embossed at 24 to stiffen the same. In the embodiment shown in Fig. 8, and also Fig. 9, the handle portion 25, corresponding to the shank section 20 previously described, is somewhat narrower than the remainder of the handle.

As stated, the container shown in Fig. 10 is illustrated as formed of paper or fiber, although it may be formed of other material or metal, and in this embodiment the closure functions and is seated the same as in that described. The cap 26 may be provided with a separate central closure 27.

In Figs. 11 to 14, the closure 27 is embossed to stiffen the same and it is provided with a guiding lip 28 opposite the handle. The handle in these embodiments does not have the joining feature of the handles described. The closure, however, may be effectively seated, although somewhat greater care is required in securing a complete seal than is required with the embodiment I have just described, in which the handle is arranged to secure a direct central thrust on the disk for final seating.

In Fig. 13, I illustrate by dotted lines at 30 a closure of larger diameter than the closure 27, from which it is seen that the closure will seat effectively although varying considerably in diameter and also that more or less of the contents may be poured off by using an internal closure of the required diameter.

While my improvements are especially adapted for use in the delivery of milk in which the whole milk is placed in the container and delivered to the customer in that manner, the closure may be inserted as indicated in Fig. 14 and the cream placed above the closure and the closure removed after the cream has been poured out, so that the remaining contents of the container may be poured out.

The receptacles or containers have the advantages recited above and further advantages will be appreciated by those skilled in this art. Also, they are easily kept sanitary as there are no shoulders or abrupt edges within the containers and there are no definite limits in which the disk may be seated. Considerable variation in diameter of the disks does not render them ineffective. However, it will be understood that this form of separator works just as effectively in containers having definite upwardly facing seats or shoulders.

While I have in mind other variations than those illustrated, it is believed that these disclosures will enable those skilled in the art to adapt my improvements as may be desired.

The terms and expressions which I have employed are used as terms of description and not of limitation, and I have no intention, in the use of said terms, and expressions, of excluding any mechanical equivalents of the features shown and described, or portions thereof, but recognize that various structural modifications are possible within the scope of the invention claimed.

I claim:

1. A container comprising a lower milk portion and an upper cream portion, the wall of the cream portion immediately above the milk portion being downwardly tapered, and an internal separator disk having a diameter somewhat greater than the smallest diameter of the tapered wall, the degree of taper of said tapered wall being such that the disk may be wedgingly engaged with the same, the disk having a handle hinged thereto and extending substantially in the plane of the disk, the handle also having a hinge spaced from the edge of the disk a distance less than the radius of the disk so that the portion of the handle between the hinges may be collapsed upon the disk by thrust imparted to the handle to facilitate the wedging of the disk into sealing position.

2. A container comprising a lower milk portion and an upper cream portion, the wall of the cream portion immediately above the milk portion being downwardly tapered, and a closure disk having a diameter somewhat greater than the smallest diameter of the downwardly tapered wall so that when the disk is introduced into the downwardly tapered portion it will engage the wall at opposite points and thrust upon one edge will swing the disk to closure position, the disk having a handle jointed to one edge thereof and being provided with a downwardly directed edge lip opposite the handle.

3. An internal separator disk for containers having a handle joined at one edge thereof with a scored joint, the disk having a downturned segmental lip on its edge opposite the handle, the score line forming the joint connecting the handle and the disk being inwardly offset substantially the thickness of the handle.

4. An internal container closure disk having a handle hinged at one edge thereof, the disk having a downwturned segmental lip on its edge opposite the handle and an upturned segmental lip adjacent the handle.

5. A container separator disk of fibrous material having a handle joined at one edge thereof with a scored joint, the disk having a downturned segmental lip on its edge opposite the handle, the score line forming the joint connecting the handle and the disk being inwardly offset substantially the thickness of the material of the handle.

6. A container closure disk having a handle joined at one edge thereof with a scored joint, the handle also having a transverse score spaced from its disk joint approximately a distance equaling approximately one-half the diameter of the disk so that the inner end of the handle between the joints may be collapsed upon the disk to permit thrust engagement of the disk at a central point.

7. A container separator disk having a handle joined thereto with a scored bendable joint, the handle extending beyond the edge of the disk and having a transverse bendable joint spaced from the edge of the disk a distance less than the diameter of the disk so that the portion of the handle between the joints may be collapsed upon the disk to facilitate sealing of the disk.

8. A milk package comprising a bottle having a lower milk portion and an upper cream portion connected thereto by a throat restricted relative to said upper portion, a top closure disk seated in the mouth of the bottle above the cream portion, a separator disk having a diameter somewhat greater than the smallest diameter of the throat, and a handle hingedly connected to said separator disk and initially extending substantially in the plane of the disk in open position thereof whereby the separator disk and handle may be introduced edgewise into the cream portion to engage the throat in open position of the disk, said handle being of a length such as to be then substantially enclosed in said upper portion by said top closure disk, further thrust on the handle rotating the separator disk about the hinge into closing position across the throat.

9. A container having a mouth adapted to be covered by a closure, a lower milk portion, an upper cream portion and a throat between said portions restricted relative to the mouth, and an internal separator disk having a periphery slightly greater than said throat, said disc having a handle hinged to the edge thereof to provide a bendable joint whereby the disk may be inserted by means of the handle with the handle trailing and passed substantially edgewise through the cream portion into engagement with the throat and having a projecting sealing lip opposite the handle, thrust on the handle causing the disk to swing to closing position relative to the throat.

10. An internal separator for removing cream from the top of a container having a mouth, a cream chamber and a milk chamber communicating through a throat restricted relative to said mouth, said separator comprising a disk and a handle hinged thereto, said handle normally extending from the disk approximately in the plane of the disk and having a hinge spaced from the edge of the disk, less than the radius of the disk, whereby when the separator disk is pushed into separating position in said restricted throat, the portion of the handle between the hinges will collapse upon the disk thereby forming a partition between said chambers so that cream may be poured off from above the said partition.

11. In combination, a container having a mouth, a cream chamber and a milk chamber communicating through a throat restricted relative to said mouth, and a separator comprising a disk and a handle hinged thereto, and having a hinge spaced from the edge of the disk with a handle portion between said hinges, said handle normally extending from the disk approximately in the plane of the disk, whereby when pressure is applied to the handle, the portion of the of handle between the hinges will collapse upon the disk turning the disk in said throat and thereby forming a partition between said chambers so that cream may be poured off from above the said partition.

WILLIAM C. TEUNISZ.